US008006231B2

(12) United States Patent
Peipelman et al.

(10) Patent No.: US 8,006,231 B2
(45) Date of Patent: Aug. 23, 2011

(54) APPARATUS AND METHOD TO AUTOMATE THE TESTING OF A GRAPHICAL USER INTERFACE (75) Inventors: Jason Lee Peipelman, Vail, AZ (US); Eric Steven Shell, Tucson, AZ (US); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 11/768,823

(22) Filed: Jun. 26, 2007

(65) Prior Publication Data
US 2009/0007071 A1  Jan. 1, 2009

(51) Int. Cl.
*G06F 9/44* (2006.01)
*G06F 9/45* (2006.01)

(52) U.S. Cl. .......................... 717/124; 717/125; 717/127

(58) Field of Classification Search ............ 717/109–11, 717/122–128, 106–116, 176–178
See application file for complete search history.

(56) References Cited

U.S. PATENT DOCUMENTS

| | | | | |
|---|---|---|---|---|
| 5,475,843 A * | 12/1995 | Halviatti et al. | ............ | 717/124 |
| 5,781,720 A * | 7/1998 | Parker et al. | .................... | 714/38 |
| 5,870,499 A | 2/1999 | Bender et al. | | |
| 5,991,537 A * | 11/1999 | McKeon et al. | ............ | 717/115 |
| 6,329,986 B1 * | 12/2001 | Cheng | ............................ | 345/419 |
| 6,370,684 B1 * | 4/2002 | De Pauw et al. | ............. | 717/124 |
| 6,502,102 B1 | 12/2002 | Haswell et al. | | |
| 6,654,911 B1 * | 11/2003 | Miles | .............................. | 714/38 |
| 6,701,514 B1 * | 3/2004 | Haswell et al. | ............... | 717/115 |
| 6,715,139 B1 * | 3/2004 | Kodosky et al. | ............. | 717/125 |
| 6,721,941 B1 * | 4/2004 | Morshed et al. | ............... | 717/127 |
| 6,763,515 B1 * | 7/2004 | Vazquez et al. | ............... | 717/109 |
| 6,907,546 B1 * | 6/2005 | Haswell et al. | .................. | 714/38 |
| 6,957,416 B2 * | 10/2005 | Adams | .......................... | 717/107 |
| 6,964,044 B1 * | 11/2005 | Hudson et al. | ................ | 717/177 |
| 6,978,440 B1 * | 12/2005 | Pavela | ........................... | 717/125 |
| 7,360,202 B1 * | 4/2008 | Seshadri et al. | ............. | 717/106 |
| 7,367,028 B2 * | 4/2008 | Kodosky et al. | ............... | 717/177 |
| 7,398,469 B2 * | 7/2008 | Kisamore et al. | ............. | 715/704 |
| 7,451,350 B2 * | 11/2008 | Cherny et al. | .................... | 714/32 |
| 7,657,872 B2 * | 2/2010 | Kelbaugh et al. | ............. | 717/124 |
| 7,717,712 B2 * | 5/2010 | Brun et al. | .................... | 434/156 |
| 2004/0081346 A1 | 4/2004 | Louden et al. | | |
| 2005/0021289 A1 | 1/2005 | Robertson et al. | | |
| 2005/0188357 A1 | 8/2005 | Derks et al. | | |
| 2006/0022972 A1 | 2/2006 | Garcowski et al. | | |

OTHER PUBLICATIONS

Xie et al, "Designing and comparing automated test oracles for GUI based software applications", ACM Trans. software engineering and methodology, vol. 16, No. 1, article 4, pp. 1-36, 2007.*

(Continued)

*Primary Examiner* — Anil Khatri
(74) *Attorney, Agent, or Firm* — Dale F. Regelman; Quarles & Brady LLP (57) ABSTRACT

A method is disclosed to automate the testing of a graphical user interface. The method supplies a computing device comprising a code base, wherein a graphical user interface ("GUI") is generated when that code base is executed, and wherein that GUI comprises a plurality of interactable graphical objects. The method color codes in the code base each of the plurality of interactable graphical objects, and then executes the code base. The method selects one of the color-coded interactable graphical objects as a test object. Using the color of the selected interactable graphical object, the method locates and activates that test object, and ascertains if an expected result was observed after activating the color-coded test object. If an expected result is not observed after activating the test object, the method generates an error message.

16 Claims, 5 Drawing Sheets

OTHER PUBLICATIONS

Burch et al, "Visual data mining in software archives", ACM pp. 37-46, 2005.*
Chen et al, "GUI test script organization with component abstraction", IEEE, pp. 128-134, 2008.*
Hui et al, "GUI regression testing based on function diagram", IEEE, pp. 559-563, 2010.*
Fu et al, "Inferriing types of references to GUI objects in test scripts", IEEE, pp. 1-10, 2009.*

* cited by examiner

```
buttonA = new Jbutton("ButtonA")'
buttonA.setName("ButtonA");
buttonA.setbackground(new Color(204,204,204));
buttonB = new Jbutton("ButtonB")'
buttonB.setName("ButtonB");
buttonB.setbackground(new Color(204,205,204));

JRadioButton aRadioButton = new JRadioButton ("Item A");
aRadioButton.setBackground(new Color(205, 204, 204));
aRadioButton.setName("RadioButton A");
aRadioButton.setSelected(true);

JRadioButton bRadioButton = new JRadioButton ("Item B");
bRadioButton.setBackground(new Color(204, 204, 205));
bRadioButton.setName("RadioButton B");

JRadioButton cRadioButton = new JRadioButton ("Item C");
cRadioButton.setBackground(new Color(204, 204, 206));
cRadioButton.setName("RadioButton C");
```

APPARATUS AND METHOD TO AUTOMATE THE TESTING OF A GRAPHICAL USER INTERFACE

FIELD OF THE INVENTION

This invention relates to an apparatus and method to automate the testing of a graphical user interface.

BACKGROUND OF THE INVENTION

A graphical user interface ("GUI") facilitates interaction with a computing device. GUIs comprise interactable graphical objects, sometimes referred to as widgets, in combination with text, represent information and actions available to a user. The actions are usually initiated through direct manipulation of the interactable graphical elements.

Graphical user interfaces often include a pointer comprising a symbol that appears on a display screen and is used to select objects and commands, a pointing device comprising for example a mouse or trackball, that enables movement of the pointer, graphical interactable objects that represent commands, files, or windows. By moving the pointer to, and activating, a interactable graphical object, a user can execute a command or open a window.

Prior art methods to test a GUI are performed manually. An operator sequentially locates and activates each interactable graphical object disposed in the GUI, and determines if an expect result is observed. Such manual testing methods are cumbersome and subject to operator error.

SUMMARY OF THE INVENTION

The invention comprises a method to automate the testing of a graphical user interface. The method supplies a code base disposed on a computing device, wherein a graphical user interface ("GUI") is generated when that code base is executed, and wherein that GUI comprises a plurality of interactable graphical objects.

The method color codes in the code base each of the plurality of interactable graphical objects, and then executes that code base. The method selects one of the color-coded interactable graphical objects as a test object. Using the color of the selected interactable graphical object, the method locates and activates that test object, and ascertains if an expected result was observed after activating the color-coded test object. If an expected result is not observed after activating the test object, the method generates an error message.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Graphical user interface ("GUI") design is an important adjunct to application programming. A GUI enhances the usability of the underlying logical design of a stored program. Applicants' invention comprises an automated method to test a GUI. In certain embodiments, Applicants' computer program product which encodes Applicants' testing method, is executed on the same computing device as is the GUI being tested.

For example and referring now to FIG. 4, computing device 410 comprises processor 414, memory 415, operating system 416, and instructions 418, wherein instructions 418 encode the method summarized in FIGS. 1, 2, 3, and described in detail hereinbelow. In certain embodiments, operating system 416 and instructions 418 are written to memory 415.

Figure 4:
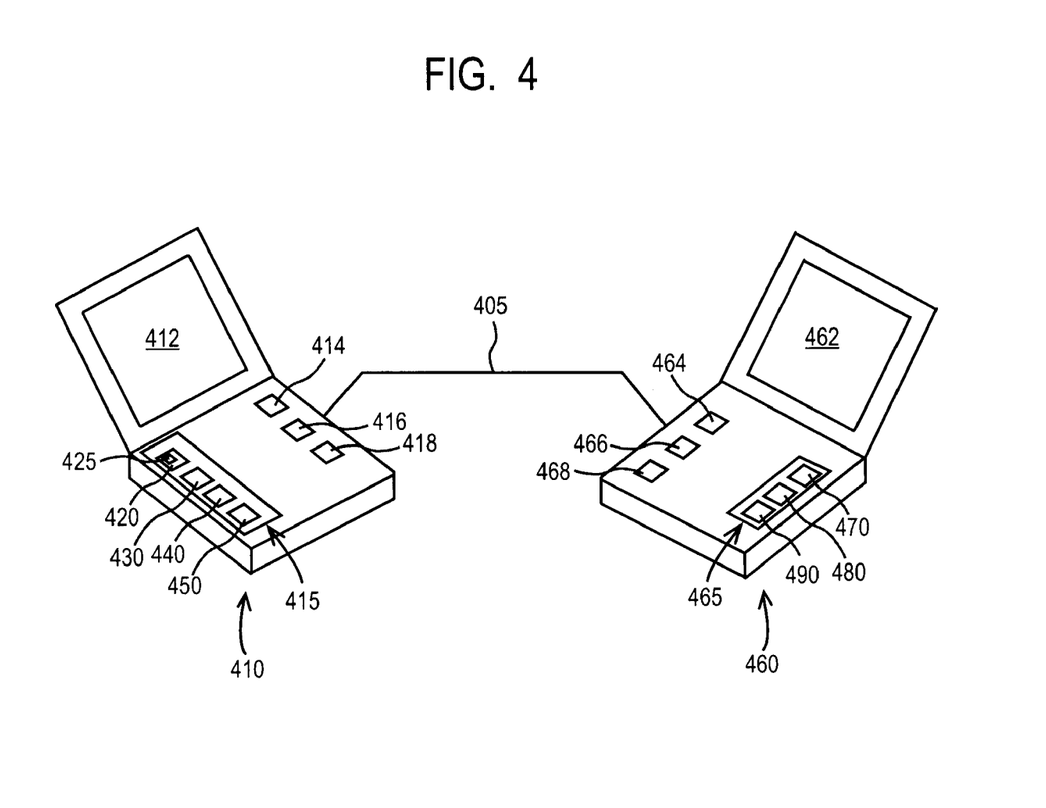
FIG. 4 is a perspective view showing the apparatus used to implement Applicants' method.

In the illustrated embodiment of FIG. 4, computing device 410 further comprises Code Base 420 that encodes GUI 425, Mapping File 430, and Catalog 440. In the illustrated embodiment of FIG. 4, Code Base 420 that encodes GUI 425, Mapping File 430, and Catalog 440, are written to memory 415.

When Code Base 420 is executed, GUI 425 is generated. In these embodiments, processor 414 can utilize computer program product 418 to test the interactable graphical objects disposed in GUI 425. In certain of Applicants' single computing device embodiments, GUI 425 is displayed on display device 412. In other single computing device embodiments, GUI 425 is not displayed on any visual display device during testing. Rather in these embodiments, computer program product 418 tests GUI 425 without GUI 425 being displayed visually.

In certain embodiments, Applicants' computer program product is executed on a second computing device, such as computing device 460, while code base 420 is executed on first computing device 410. In the illustrated embodiment of FIG. 4, computing device 410 is interconnected with computing device 460 via communication link 405.

Figure 1:
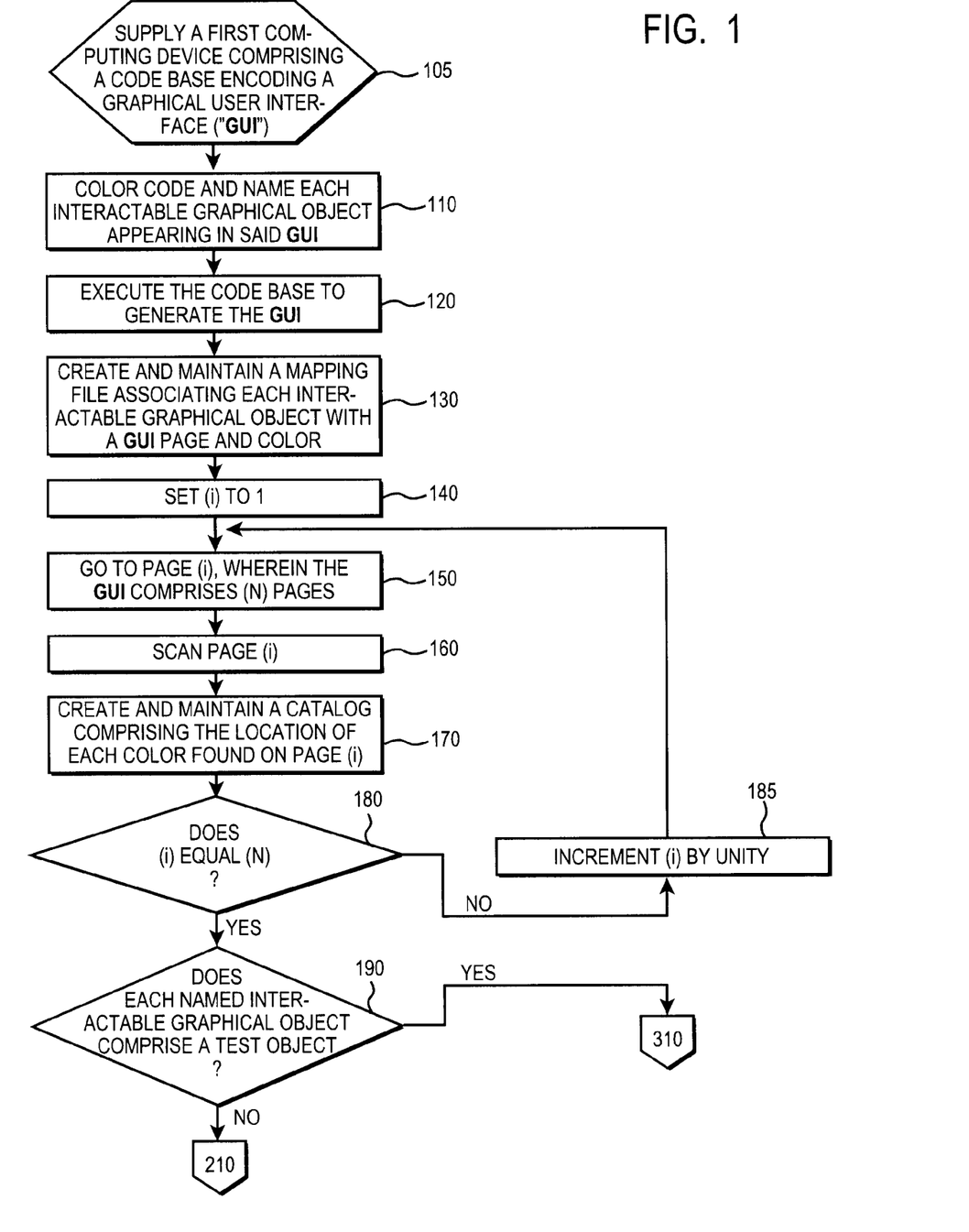
FIG. 1 is a flow chart summarizing the initial steps of Applicants' method.
Figure 2:
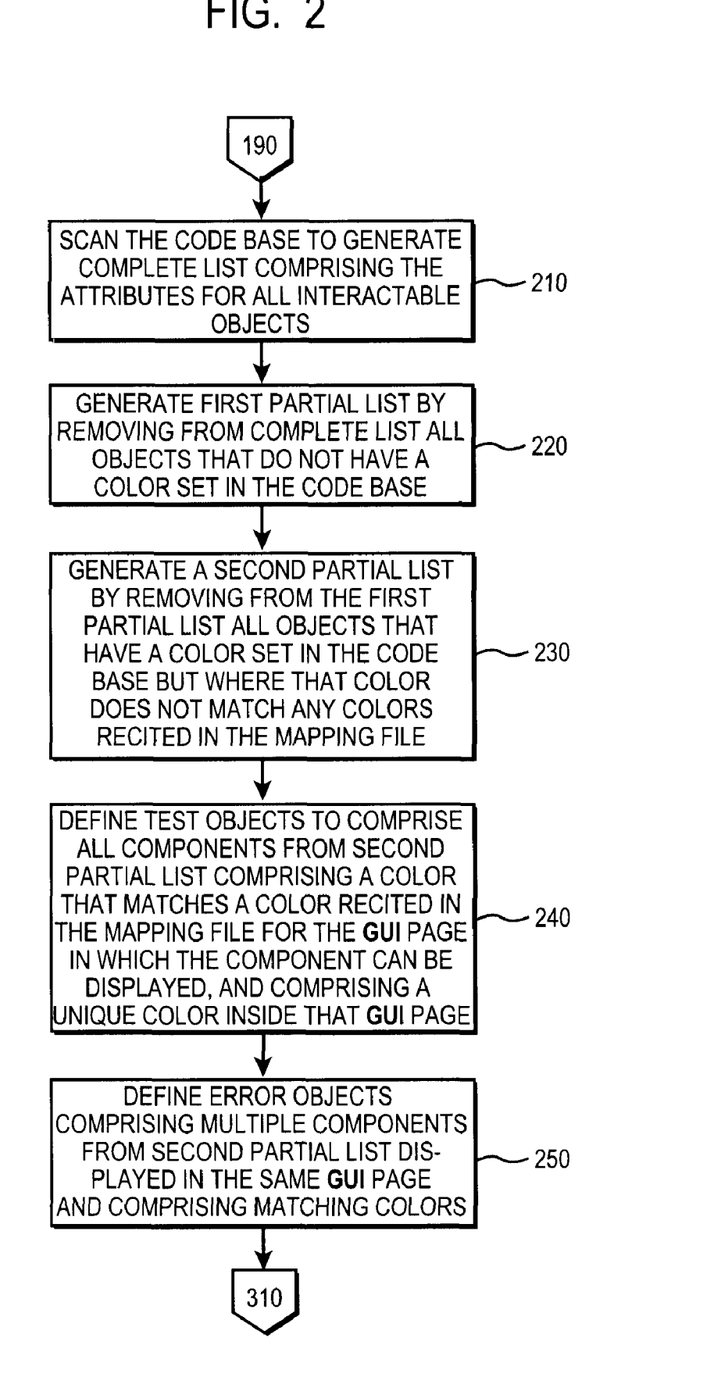
FIG. 2 is a flow chart summarizing additional steps of Applicants' method.
Figure 3:
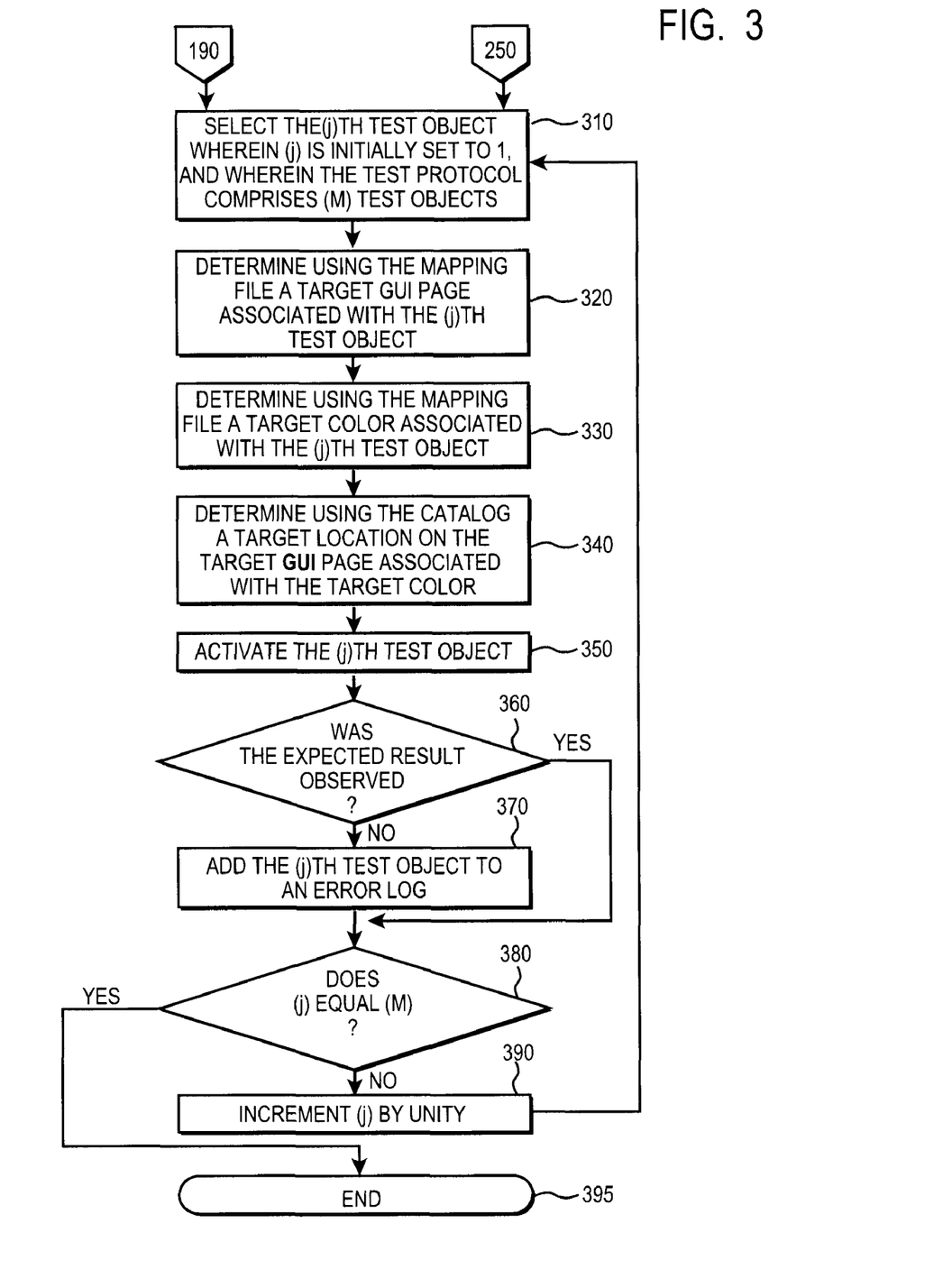
FIG. 3 is a flow chart summarizing additional steps of Applicants' method.

Further in the illustrated embodiment of FIG. 4, computing device 460 comprises processor 464, operating system 466, and instructions 468, wherein instructions 468 encode Applicants' testing method summarized in FIGS. 1, 2, and 3, and wherein instructions 470 further comprises computer readable code to control the operation of computing device 410. In certain embodiments, operating system 466 and instructions 468 are written to memory 465.

In the illustrated embodiment of FIG. 4, computing device 460 further comprises Mapping File 470 and Catalog 480. In the illustrated embodiment of FIG. 4, Mapping File 470 and Catalog 480 are written to memory 465.

FIG. 1 summarizes the steps of Applicants' method relating to color-coding individual interactable graphical objects, forming a Mapping File, such as Mapping File 430 and/or 470, that associates each interactable graphical object to a color and a GUI page, and forming a Catalog, such as Catalog 440 and/or 480, that recites the individual colors disposed in each page of the GUI. Referring now to FIG. 1, in step 105 the method supplies a first computing device, such as computing device 410 comprising a first processor, such as processor 414 (FIG. 4), a first operating system, such as first operating system 416 (FIG. 4), and a Code Base, such as Code Base 420 (FIG. 4), wherein that Code Base encodes a GUI, such as GUI 425 (FIG. 4). In certain embodiments, the Code Base of step 105 comprises a plurality of color-coded graphical objects encoded therein.

Figure 5A:
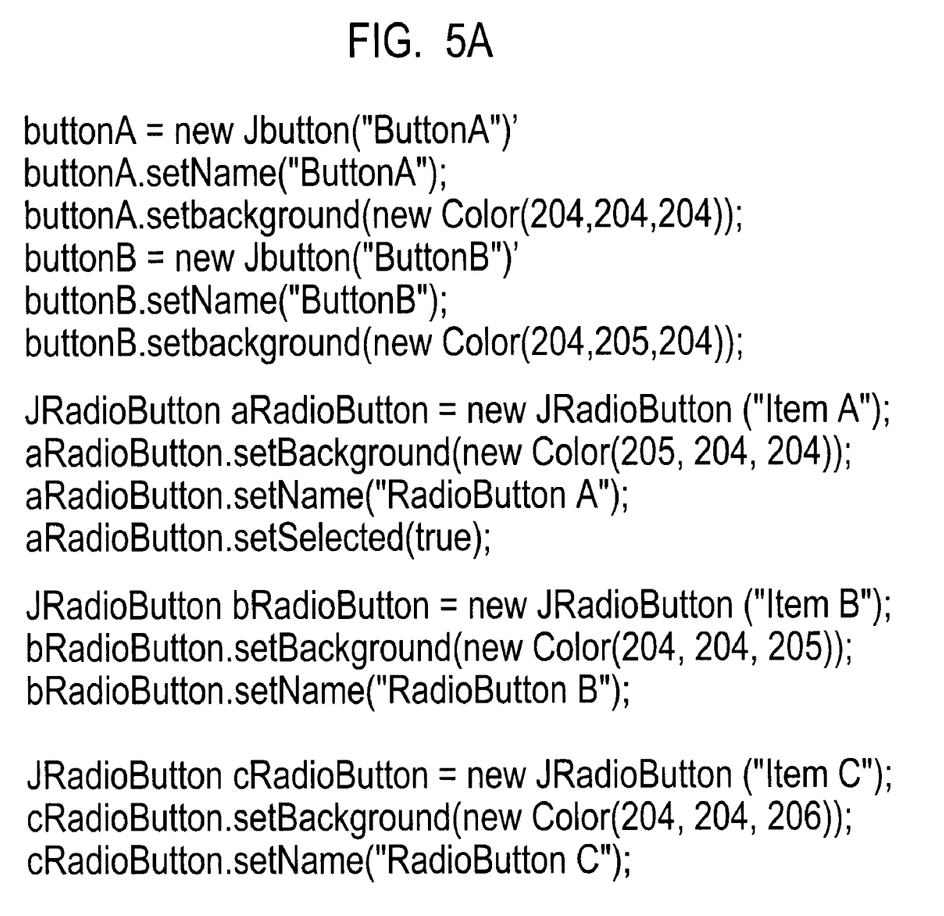
FIG. 5A illustrates the coding used to color code five interactable graphical objects.
Figure 5B:
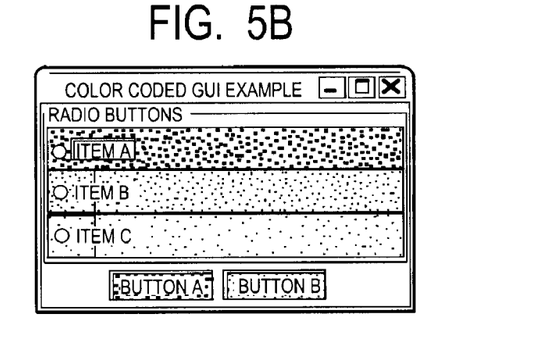
FIG. 5B shows a graphical user interface comprising the five color-coded interactable graphical objects of FIG. 5A.

In certain embodiments in step 110 the method names each color-coded, interactable graphical object disposed in the GUI. For example and referring now to FIGS. 5A and 5B, the coding of FIG. 5A generates the color-coded GUI of FIG. 5B.

In step 120, the method generates the GUI encoded in the Code Base. In certain embodiments, the method in step 120 executes the Code Base of step 105 thereby generating the GUI encoded therein. In certain embodiments, step 120 further comprises running the Code Base on the first computing device of step 105, wherein that first computing device comprises instructions 418 which cause processor 414 to perform step 120.

In certain embodiments, step 120 comprises supplying a second computing device in communication with the first computing device of step 105, such as second computing device 460 (FIG. 4), wherein the second computing device comprises a second processor 464, a second operating system 466, and second instructions 468 which cause the second processor 464 to instruct the first processor 414 to execute Code Base 420 of step 105.

In step 130, the method creates and maintains a Mapping File, such as Mapping File 430 and/or Mapping File 470, associating each interactable graphical object disposed in the GUI with a GUI page and color. In certain embodiments, step 130 is performed manually. In certain embodiments, step 130 is performed by the first computing device using the first processor and the first instructions. In certain embodiments, step 130 is performed by the second computing device using the second processor and the second instructions.

In step 140, the method sets a variable (i) to 1, wherein (i) designates one certain page of the GUI. In certain embodiments, step 140 is performed by the first computing device using the first processor and the first instructions. In certain embodiments, step 140 is performed by the second computing device using the second processor and the second instructions.

In step 150, the method goes to the (i)th page of the GUI, wherein the GUI comprises a total of (N) pages, and wherein (N) is greater than or equal to 1. In certain embodiments, step 150 is performed by the first computing device using the first processor and the first instructions. In certain embodiments, step 150 is performed by the second computing device using the second processor and the second instructions.

In step 160, the method scans the (i)th GUI page and determines the location of each color found in that (i)th GUI page. In certain embodiments, step 160 comprises using a Function (1):

$$\text{getPixelColor(int x, int y)} \qquad (1)$$

wherein Function (1) returns the color of a pixel at screen coordinates x and y. In certain embodiments, step 130 is performed by the first computing device using the first processor and the first instructions, wherein the first instructions comprise Function (1). In certain embodiments, step 130 is performed by the second computing device using the second processor and the second instructions, wherein the second instructions comprise Function (1).

In step 170, the method creates and maintains a Catalog comprising the location and description of each color found in step 160 on the (i)th GUI page. In certain embodiments, step 170 is performed by the first computing device using the first processor and the first instructions. In certain embodiments, step 170 is performed by the second computing device using the second processor and the second instructions.

In step 180, the method determines if each page of the GUI has been scanned, i.e. if (i) equals (N). In certain embodiments, step 180 is performed by the first computing device using the first processor and the first instructions. In certain embodiments, step 180 is performed by the second computing device using the second processor and the second instructions.

If the method determines in step 180 that additional GUI pages need to be scanned, i.e. if (i) does not equal (N), then the method transitions from step 180 to step 185 wherein the method increments (i) by unity. The method transitions from step 185 to step 150 and continues as described herein. In certain embodiments, step 185 is performed by the first computing device using the first processor and the first instructions. In certain embodiments, step 185 is performed by the second computing device using the second processor and the second instructions.

Alternatively, the method determines in step 180 that no additional GUI pages need to be scanned, i.e. if (i) does equal (N), then the method transitions from step 180 to step 190 wherein the method determines if each interactable graphical object disposed in the GUI comprises a Test Object. In certain embodiments, step 190 is performed by the GUI programmer. In certain embodiments, step 190 is performed by the computer program product programmer. In certain embodiments, step 190 is performed by the first computing device using the first processor and the first instructions. In certain embodiments, step 190 is performed by the second computing device using the second processor and the second instructions.

If the method determines in step 190 that each interactable graphical object disposed in the GUI comprises a Test Object, then the method transitions from step 190 to step 310 (FIG. 3). Alternatively, if the method determines in step 190 that each interactable graphical object disposed in the GUI does not necessarily comprise a Test Object, then the method transitions from step 190 to step 210 (FIG. 2).

Referring now to FIG. 2, in step 210 the method scans the Code Base to generate a complete list comprising the attributes for all interactable objects. In certain embodiments, step 210 is performed by the first computing device using the first processor and the first instructions. In certain embodiments, step 210 is performed by the second computing device using the second processor and the second instructions.

In step 220, the method generates a first partial list by removing from the complete list of step 210 all interactable objects that do not have a color set in the Code Base. In certain embodiments, step 220 is performed by the first computing device using the first processor and the first instructions. In certain embodiments, step 220 is performed by the second computing device using the second processor and the second instructions.

In step 230, the method generates a second partial list by removing from the first partial list all interactable objects that have a color set in the Code Base but where that color does not match any colors recited in the Mapping File. In certain embodiments, step 230 is performed by the first computing device using the first processor and the first instructions. In certain embodiments, step 230 is performed by the second computing device using the second processor and the second instructions.

In step 240, the method defines the Test Objects to comprise all interactable graphical objects from the second partial list that comprise a color that matches a color recited in the Mapping File for the GUI page in which the interactable graphical object can be displayed, and comprising a unique color inside that GUI page. In certain embodiments, step 240 is performed by the first computing device using the first processor and the first instructions. In certain embodiments, step 240 is performed by the second computing device using the second processor and the second instructions.

In step 250, the method defines Error Objects to comprise multiple interactable graphical objects recited on the second partial list displayed, where those multiple interactable graphical objects are disposed in the same GUI page and comprises matching colors. In certain embodiments, step 250 is performed by the first computing device using the first processor and the first instructions. In certain embodiments, step 250 is performed by the second computing device using the second processor and the second instructions.

The method transitions from step 250 to step 310 (FIG. 3). FIG. 3 summarizes the steps of the method to test each interactable graphical object encoded in the Code Base and that is denominated as a Test Object. As described in detail hereinabove, in certain embodiments in step 190 (FIG. 1) every interactable graphical object recited in the Code Base is designated as a Test Object. In other embodiments, and as summarized in FIG. 2, in step 240 (FIG. 2) only certain of the interactable graphical objects encoded in the Code Base are designated as Test Objects.

Referring now to FIG. 3, in step 310 the method selects the (j)th Test Object, wherein (j) is initially set to 1, and wherein (M) interactable graphical objects are designated as Test Objects. In certain embodiments, step 310 is performed by the first computing device using the first processor and the first instructions. In certain embodiments, step 310 is performed by the second computing device using the second processor and the second instructions.

In step 320, the method determines using the Mapping File a target GUI page associated with the (j)th Test Object. In certain embodiments, step 320 is performed by the first computing device using the first processor and the first instructions. In certain embodiments, step 320 is performed by the second computing device using the second processor and the second instructions.

In step 330, the method determines using the Mapping File a target color associated with the (j)th Test Object. In certain embodiments, step 330 is performed by the first computing device using the first processor and the first instructions. In certain embodiments, step 330 is performed by the second computing device using the second processor and the second instructions.

In step 340, the method determines using the Catalog a target location on the target GUI page associated with the target color. In certain embodiments, step 340 is performed by the first computing device using the first processor and the first instructions. In certain embodiments, step 340 is performed by the second computing device using the second processor and the second instructions.

In step 350, the method places a pointer onto, and activates, the (j)th Test Object. In certain embodiments, in step 350 the first computing device uses Function (2):

$$\text{Robot}(\,) \tag{2}$$

wherein Function (2) constructs a Robot object in the coordinate system of display device 412.

In certain embodiments, in step 350 the second computing device uses Function (3):

$$\text{Robot}(\text{GraphicsDevice412 screen}) \tag{3}$$

wherein Function (3) constructs a Robot object in the coordinate system of display device 412.

In certain embodiments, in step 350 either the first computing device or the second computing device utilize Functions (4), (5), and (6) to move a mouse pointer to the (j)th Test Object, and to activate the (j)th Test Object:

$$\text{mouseMove}(\text{int x, int y}) \tag{4}$$

$$\text{mousePress}(\text{int buttons}) \tag{5}$$

$$\text{mouseRelease}(\text{int buttons}) \tag{6}$$

In step 360, the method determines if an expected result was observed after activating the (j)th Test Object in step 350. In certain embodiments, the expected result of step 360 comprises initiating a function call. In certain embodiments, the expected result of step 360 comprises opening a new window. In certain embodiments, the expected result of step 360 comprises displaying certain text and/or graphics.

If the method determines in step 360 that the expected result was not observed, then the method transitions from step 360 to step 370 wherein the method adds the (j)th Test Object to an error log. In certain embodiments, in step 370 the method displays an error message on display device 412 and/or display device 462. In certain embodiments, in step 370 the method adds the (j)th Test Object to the Error Objects listing of step 250 (FIG. 2).

In certain embodiments, individual steps recited in FIG. 1, and/or FIG. 2, and/or FIG. 3, may be combined, eliminated, or reordered.

In certain embodiments, Applicants' invention includes instructions residing in computer readable medium, such as for example memory 415 (FIG. 4) or memory 465 (FIG. 4), wherein those instructions are executed by a processor, such as processor 414 (FIG. 4) or processor 464 (FIG. 4), respectively, to perform one or more of steps 120, 130, 140, 150, 160, 170, 180, 185, and/or 190, recited in FIG. 1, and/or one or more of steps 210, 220, 230, 240, and/or 250, recited in FIG. 2, and/or one or more of steps 310, 320, 330, 340, 350, 360, 370, 380, and/or 390, recited in FIG. 3.

In other embodiments, Applicants' invention includes instructions residing in any other computer program product, where those instructions are executed by a computer external to, or internal to, system 100, to perform one or more of steps 120, 130, 140, 150, 160, 170, 180, 185, and/or 190, recited in FIG. 1, and/or one or more of steps 210, 220, 230, 240, and/or 250, recited in FIG. 2, and/or one or more of steps 310, 320, 330, 340, 350, 360, 370, 380, and/or 390, recited in FIG. 3. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to automate testing of a graphical user interface, comprising the steps of:
   supplying a code base disposed on a first computing device and encoding a plurality of color-coded, interactable graphical objects, wherein a graphical user interface ("GUI") is generated when said code base is executed, and wherein said GUI comprises said plurality of interactable graphical objects;
   executing said code base to generate said GUI;
   displaying said GUI on a visual display device;
   creating a mapping file associating each interactable graphical object with a color and with a GUI page, wherein each interactable graphical object recited in said mapping file does not comprise a test object;
   scanning said code base to generate a complete list comprising the attributes of each interactable graphical object encoded therein;
   forming a first partial list by removing from said complete list all objects that do not have a color set in the code base;
   forming a second partial list by removing from the first partial list all interactable graphical objects that have a color set in the Code Base but where that color does not match any colors recited in the Mapping File;
   defining test objects to comprise all interactable graphical objects from second partial list comprising a color that matches a color recited in the Mapping File for the GUI page in which the interactable graphical object is displayed, and comprising a unique color inside that GUI page;
   selecting one of said color-coded interactable graphical objects as a test object;
   activating said test object;
   ascertaining if an expected result was observed after activating said test object;
   operative if an expected result was not observed after activating said test object, generating and saving an error message.

2. The method of claim 1, further comprising the steps of:
   supplying a second computing device in communication with said first computing device;
   wherein said selecting step, said activating step, said ascertaining step, said generating step and said saving step, are performed by said second computing device.

3. The method of claim 1, wherein said GUI comprises (N) pages, further comprising the steps of:
   establishing a catalog;
   setting (i) to 1;
   examining the (i)th GUI page;
   adding to said catalog the location of each color disposed on said (i)th GUI page.

4. The method of claim 3, further comprising the steps of:
   incrementing (i) by unity sequentially until (i) equals (N);
   for each value of (i), repeating said examining step and said adding step.

5. The method of claim 4, further comprising the step of determining if each interactable graphical object recited in said mapping file comprises a test object.

6. The method of claim 5, wherein:
   each interactable graphical object recited in said mapping file does comprise a test object;
   said mapping file comprises (M) interactable graphical objects;
   said selecting step comprises selecting the (j)th test object, wherein (j) is initially set to 1, and wherein (j) is greater than or equal to 1 and less than or equal to (M);
   said method further comprising the steps of:
   using said mapping file, determining a target GUI page associated with said (j)th test object;
   using said mapping file, determining a target color associated with said (j)th test object;
   using said catalog, determining a target location on said target GUI page, wherein said target location comprises said target color;
   wherein said activating step comprises activating said (j)th test object;
   wherein said ascertaining step comprises ascertaining if an expected result was observed after activating said (j)th test object.

7. The method of claim 6, further comprising the steps of:
   providing a second computing device comprising memory and a processor, and in communication with said first computing device;
   encoding said mapping file in said memory;
   encoding said catalog in said memory;
   performing by said second computing device said selecting step, said determining a target GUI page step, said determining a target color step, said determining the location on said target GUI page of said target color step, said activating step, and said ascertaining step.

8. The method of claim 1, further comprising the step of defining error objects comprising multiple interactable graphical objects from second partial list displayed in the same GUI page and comprising matching colors.

9. An article of manufacture comprising a processor, and a computer readable medium having computer readable program code disposed therein to automate testing of a graphical user interface ("GUI") generated by an interconnected computing device comprising a code base, wherein said GUI is generated when said code base is executed, and wherein said GUI comprises a plurality of interactable graphical objects, wherein each of said plurality of interactable graphical objects has been color coded in said code base, the computer readable program code comprising a series of computer readable program steps to effect:
   executing said code base to generate said GUI;
   creating a mapping file associating each interactable graphical object with a GUI page, and with a color, wherein each interactable graphical object recited in said mapping file does not comprise a test object;
   displaying said GUI on a visual display device;
   scanning said code base to generate a complete list comprising the attributes of each interactable graphical object encoded therein;
   forming a first partial list by removing from said complete list all objects that do not have a color set in the code base;
   forming a second partial list by removing from the first partial list all interactable graphical objects that have a color set in the Code Base but where that color does not match any colors recited in the Mapping File;

defining test objects to comprise all interactable graphical objects from second partial list comprising a color that matches a color recited in the Mapping File for the GUI page in which the interactable graphical object is displayed, and comprising a unique color inside that GUI page;

selecting one of said color-coded interactable graphical objects as a test object;

activating said test object;

ascertaining if an expected result associated with said selected test object was observed after activating said test object;

operative if said expected result was not observed after activating said test object, generating and saving an error message.

10. The article of manufacture of claim 9, said computer readable program code further comprising a series of computer readable program steps to effect defining error objects comprising multiple interactable graphical objects from said second partial list displayed in the same GUI page and comprising matching colors.

11. The article of manufacture of claim 10, wherein:

said mapping file comprises (M) interactable graphical objects;

said selecting step comprises selecting the (j)th test object, wherein (j) is initially set to 1, and wherein (j) is greater than or equal to 1 and less than or equal to (M);

said computer readable program code further comprising a series of computer readable program steps to effect:

using said mapping file, determining a target GUI page associated with said (j)th test object;

using said mapping file, determining a target color associated with said (j)th test object;

using said catalog, determining the location on said target GUI page of said target color;

wherein said activating step comprises activating said (j)th test object;

wherein said ascertaining step comprises ascertaining if an expected result was observed after activating said (j)th test object.

12. The article of manufacture of claim 9, wherein said GUI comprises (N) pages, said computer readable program code further comprising a series of computer readable program steps to effect:

establishing a catalog;

for each value of (i), examining the (i)th GUI page;

adding to said catalog the location of each color disposed on said (i)th GUI page;

wherein (i) is greater than or equal to 1 and less than or equal to (N).

13. A computer program product encoded in an information storage medium disposed in a second computing device, wherein said computer program product is usable with a programmable computer processor to automate testing of a graphical user interface ("GUI") generated by an interconnected first computing device comprising a code base, wherein said GUI is generated when said code base is executed, and wherein said GUI comprises a plurality of interactable graphical objects, wherein each of said plurality of interactable graphical objects has been color coded in said code base, comprising:

computer readable program code which causes said programmable computer processor to instruct said first computing device to execute said code base;

computer readable program code which causes said programmable computer processor to display said GUI on a visual display device;

computer readable program code which causes said programmable computer processor to create a mapping file associating each interactable graphical object with a color and with a GUI page;

computer readable program code which causes said programmable computer processor to scan said code base to generate a complete list comprising the attributes of each interactable graphical object disposed therein;

computer readable program code which causes said programmable computer processor to form a first partial list by removing from said complete list all interactable graphical objects that do not have a color set in the code base;

computer readable program code which causes said programmable computer processor to form a second partial list by removing from the first partial list all interactable graphical objects that have a color set in the Code Base but where that color does not match any colors recited in the Mapping File;

computer readable program code which causes said programmable computer processor to define test objects to comprise all interactable graphical objects from said second partial list comprising a color that matches a color recited in the Mapping File for the GUI page in which the interactable graphical object is displayed, and comprising a unique color inside that GUI page;

computer readable program code which causes said programmable computer processor to select one of said color-coded interactable graphical objects as a test object;

computer readable program code which causes said programmable computer processor to activate said test object;

computer readable program code which causes said programmable computer processor to ascertain if an expected result associated with said selected test object was observed after activating said test object;

computer readable program code which, if said expected result was not observed after activating said test object, causes said programmable computer processor to generate and save an error message.

14. The computer program product of claim 13, further comprising computer readable program code which causes said programmable computer processor to define as error objects comprising multiple interactable graphical objects from second partial list displayed in the same GUI page and comprising matching colors.

15. The computer program product of claim 13, wherein said GUI comprises (N) pages, further comprising:

computer readable program code which causes said programmable computer processor to establish a catalog;

computer readable program code which causes said programmable computer processor to, for each value of (i), scan the (i)th GUI page;

computer readable program code which causes said programmable computer processor to add to said catalog the location of each color disposed on said (i)th GUI page;

wherein (i) is greater than or equal to 1 and less than or equal to (N).

16. The computer program product of claim 15, wherein:

said mapping file comprises (M) interactable graphical objects;

said computer readable program code to select one of said color-coded interactable graphical objects comprises computer readable program code which causes said programmable computer processor to select the (j)th test object, wherein (j) is initially set to 1, and wherein (j) is greater than or equal to 1 and less than or equal to (M);

wherein said computer program product further comprises:

computer readable program code which causes said programmable computer processor to, using said mapping file, determine a target GUI page associated with said (j)th test object;

computer readable program code which causes said programmable computer processor to, using said mapping file, determine a target color associated with said (j)th test object;

computer readable program code which causes said programmable computer processor to, using said catalog, determine the location on said target GUI page of said target color;

wherein said computer readable program code to activate the selected test object comprises computer readable program code which causes said programmable computer processor to activate said (j)th test object;

wherein said computer readable program code to ascertain if an expected result was observed after activating said test object comprises computer readable program code which causes said programmable computer processor to ascertain if an expected result was observed after activating said (j)th test object.

\* \* \* \* \*